350-3.78 SR
XR 3,911,410

United Sta

Ohta et al.

[11] 3,911,410
[45] Oct. 7, 1975

[54] LIGHT DEFLECTION STABILIZING APPARATUS

[75] Inventors: Yoshinori Ohta; Fujio Saito; Mitsuhito Sakaguchi, all of Tokyo, Japan

[73] Assignee: Nippon Electric Company Limited, Tokyo, Japan

[22] Filed: May 17, 1974

[21] Appl. No.: 471,158

[30] Foreign Application Priority Data
June 28, 1974 Japan ............................... 48-55884

[52] U.S. Cl. ............ 340/173 LM; 353/27; 350/3.5; 250/557; 250/578
[51] Int. Cl.$^{2}$ ......................................... G11C 13/04
[58] Field of Search ......... 340/173 LM; 353/27, 26, 353/25; 350/3.5; 250/557, 578

[56] References Cited
UNITED STATES PATENTS
3,715,733 2/1973 Feiner ................................ 350/3.5
3,832,698 8/1974 Ishii .................................... 350/3.5

*Primary Examiner*—Terrell W. Fears
*Attorney, Agent, or Firm*—John M. Calimafde

[57] ABSTRACT

An ultrasonic deflector is energized by a variable frequency high frequency source to diffract an incident coherent light beam to a desired location, e.g., a location on an optical memory plate conforming to an input memory access (address) word. To assure proper access beam deflection, a monitor coherent beam portion undergoes the same relative deflection as the access beam, and impinges upon a holographic plate storing in Gray encoded minihologram form the identity of the address being energized by the access beam. A feedback loop assures proper positioning of the access beam by obviating any difference between the input access command word and the output of the monitor channel.

In accordance with varying aspects of the present invention, deflection control apparatus may be employed for plural deflection axes.

5 Claims, 3 Drawing Figures

3911410
OR IN 340/173LM

LIGHT DEFLECTION STABILIZING APPARATUS

DETAILED DESCRIPTION OF THE INVENTION

Figures 1, 2:
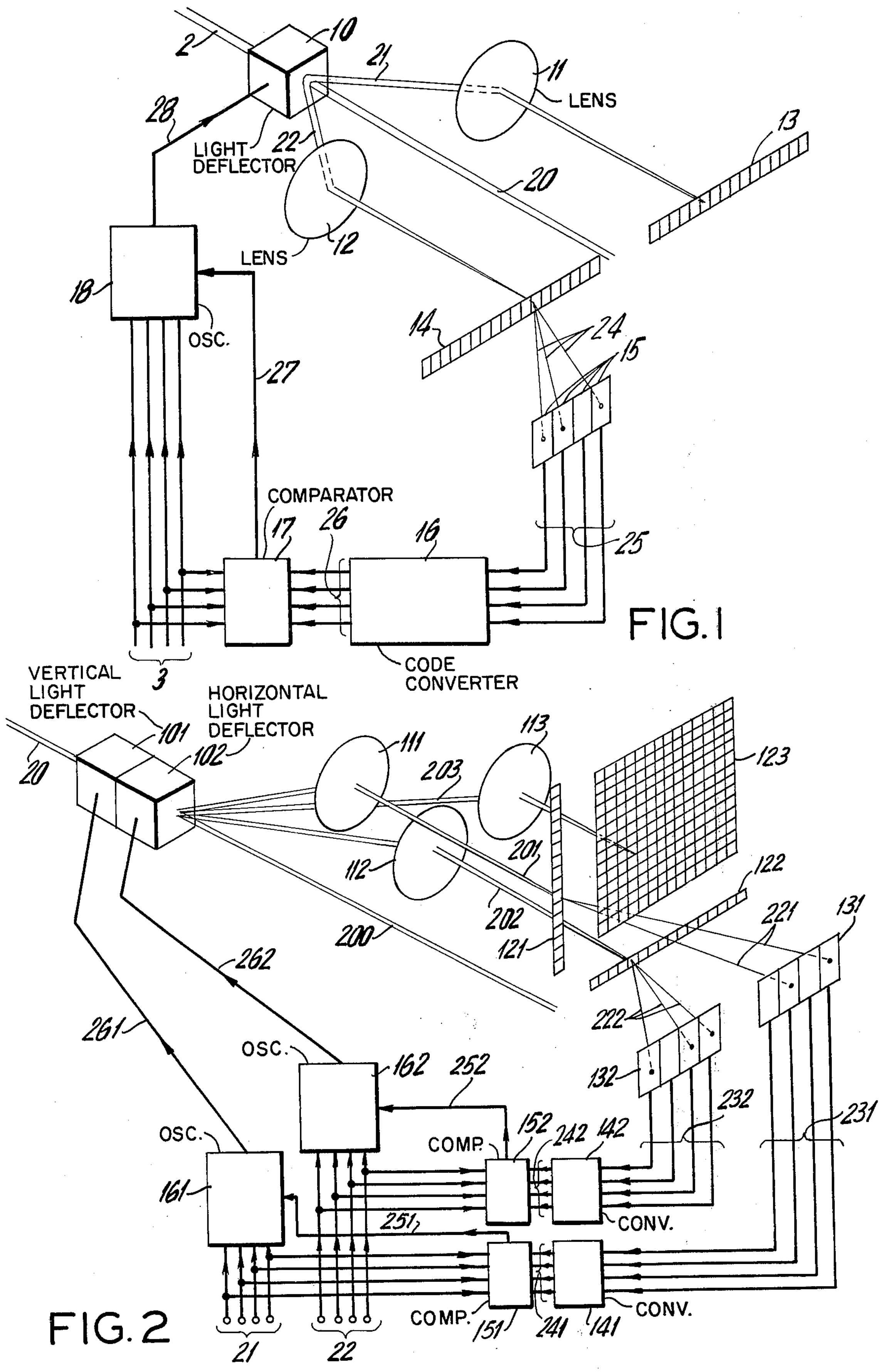

This invention relates to electro-optical apparatus and, more specifically, to an arrangement for stabilizing the position of an optical memory plate where a light beam, deflected by a light deflector employing an ultrasonic wave, impinges.

An optical data processing system can normally operate at a high operational processing speed, thus making high information storage density available. Various types of optical data processing systems have been proposed, one of which uses a light deflector as an access medium to write and read data from an optical memory, e.g., a holographic memory. In such a system, because the optical memory is of a high storage denisty, the accuracy of the deflected beam position effected by the light deflector must be strictly controlled. Light deflectors for providing random access to an optical memory are generally of one of two types. One such deflector utilizes electro-optic effects, and the other utilizes diffraction effects, employing an ultrasonic wave. The latter is in wide use because of its physical compactness, and the ease of optical adjustment provided.

An ultrasonic light deflector for deflecting incident light consists essentially of a solid-state deflection medium, and an electro-acoustic transducer bonded to the deflection medium. A high frequency signal applied to the electro-acoustic transducer causes ultrasonic oscillation in the deflection medium. This ultrasonic wave causes a phase grating to be formed in the solid-state mediums, of which the optical refractive index changes periodically through an acousto-optic effect. As a result, the incident light beam is diffracted by the phase grating. The periodicity in the phase grating depends on the frequency at which the transducer is driven. Hence the angle of diffraction which the incident light beam undergoes can be controlled by properly adjusting the frequency of the transducer driving energization.

If the ultrasonic frequency, i.e., the transducer driving frequency is constant, the light beam diffraction angle will not deviate in theory. In practice, however, the diffraction angle, i.e., the beam deflection angle does deviate because of ambient factors such as changes in temperature, and heat produced by mechanical vibrations of the light deflector caused by the ultrasonic wave. This spurious deviation is undesirable when the ultrasonic light deflector is used for writing and reading data into or out of an optical memory formed of arrays of dots or minihologram. Because the optical memory has a high storage density, the dots or holograms are located very close to each other, and a deviation of the deflection angle will cause incorrect data to be written or read, and/or lowers the signal-to-noise ratio because of cross-talk.

It is an object of the present invention to provide improved light deflection apparatus.

More specifically, it is an object of the present invention to provide an arrangement for stabilizing light deflection including a control system which compensates for any deviation of the deflection characteristic of the ultrasonic light deflector, thus accurately directing the deflected light beam vis-a-vis the optical memory.

Briefly, the arrangement of this invention comprises an ultrasonic light deflector for deflecting an incident coherent light beam in an amount dependent upon a deflector-driving high-frequency electric signal; a high frequency oscillator for generating the high frequency signal having a frequency determined in accordance with an access signal designating the magnitude of the deflection for the coherent light beam; a hologram code plate comprising a plurality of mini-holograms for reproducing a light beam train representing a code of the coordinate of the position where the deflected coherent light beam is applied; a photodetector for detecting the reproduced light beam train; and a comparator for comparing the output signal of the photodetector with the access signal and controlling the oscillation frequency of the high frequency oscillator to achieve coincidence between the two signals.

Operation of the light deflector stabilizer of this invention will now be briefly described. A coherent light beam incident upon the ultrasonic light deflector is split into a zero-order light beam which is not diffracted, and a plurality of diffracted light beams. At least two of the diffracted beams form equal angles with the zero-order beam. One of the two diffracted beams is used for memory access, and the other for deflection angle monitoring. The deflection angles of these diffracted light beams depend on the transducer driving frequency applied to the deflector, as described above. An externally applied memory access signal changes the transducer driving frequency and thereby determines the position on the memory plate to which the diffracted light beam is directed.

A hologram code plate is used to receive the monitoring diffracted light beam for monitoring the magnitude of deflection. The hologram code plate is made up of a number of mini-holograms, and a code indicating the position of each hologram is recorded on each hologram. When this hologram plate is exposed to the monitoring diffracted coherent light beam component, a signal including the positional code is reproduced. The difference between the positional signal read out from the interrogated minihologram and the original access signal is the deviation between the desired access signal and the position on the memory where the deflected light beam has actually been directed. This difference signal is used to control the transducer driving frequency in a direction to obviate the error, and thus the deviation caused in the light deflector due to a temperature variation or the like is compensated.

A Gray code is used for the positional code recorded on each small hologram on the hologram code plate. The Gray code is a system of binary number notations wherein only one binary digit changes value between any two consecutive (adjacent) numbers. Therefore, even if a light beam is directed to an area between two adjacent mini-holograms, and the positional codes of the two holograms are concurrently reproduced and detected in superimposed relation, the detected signal represents the positional code of whichever mini-hologram is required to allow a correct feedback signal to be supplied to the control system. If a straight binary code is used for the positional code, it is likely that a positional code totally irrelevant to the positional codes of the mini-holograms interrogated would be detected. In such event, it will be impossible to stabilize the control system.

Figure 3:
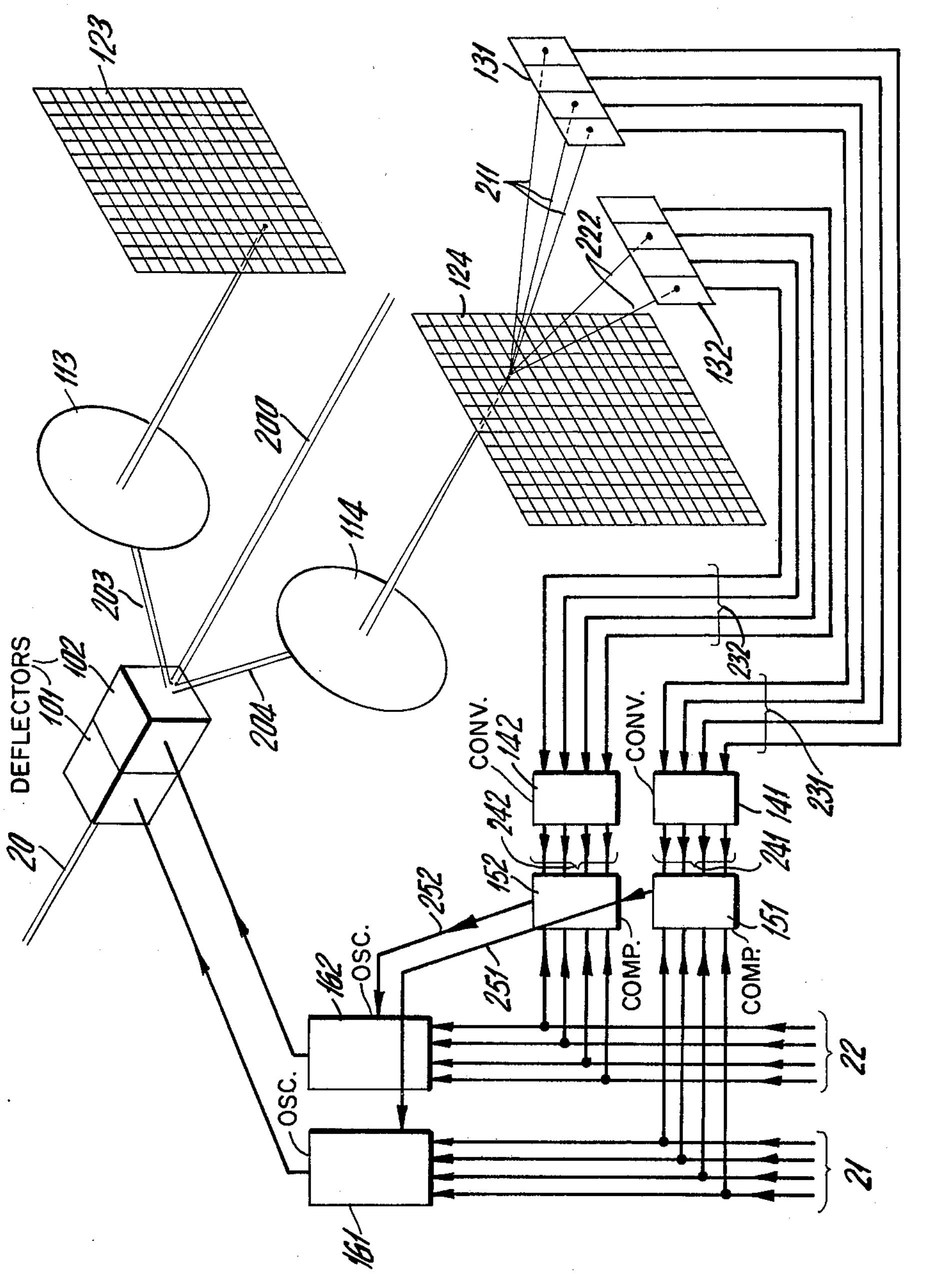

The above and other features and advantages of the invention will become more apparent from the following description of specific illustrative embodiments thereof presented in conjunction with the accompanying drawing, in which FIGS. 1–3 schematically depict first through third embodiments of the present invention.

Referring now to FIG. 1, there is schematically shown a one-dimensional light deflection stabilizing arrangement illustrating the principles of the present invention. An access signal 3 designates the deflection position on a memory plate 13 where a light beam 21, deflected by an ultrasonic light deflector 10 is to impinge. A high frequency oscillator 18 generates a sinusoidal electric signal 28 having a frequency dependent upon the access signal 3. This sinusoidal signal is supplied to the ultrasonic deflector 10 to cause an ultrasonic oscillation in the deflector.

The ultrasonic deflector 10 diffracts an input light beam 2 at a diffraction angle corresponding to the frequency of the high frequency signal 28. In particular, the beam 2 has output diffracted components including a (+) first-order memory accessing diffraction light beam 21; a zero-order light beam 20; and a (—) first-order access monitoring diffraction light beam 22. The zero-order beam 20 is the output light component which is not diffracted by acoustic wave. The diffracted light beams 21 and 22 form equal angles with respect to the zero-order beam 20. The (+) first-order diffraction light 21, directed at a deflection angle determined by the access signal 3, is focused through a focusing lens 11 on the memory plate 13 comprising dots or mini-holograms, in which data is written or from which data is read.

As previously described, there may be deviation of the diffraction angle for both the first-order diffraction beams 21 and 22 due to changes in the ambient temperature of the deflector 10. Also, heat is produced in the acoustic oscillator transducer due to mechanical vibrations, which gives rise to a temperature gradient in the deflector which affects the exit angle of the diffracted light beam components. In other words, with the arrangement as described above, the position on the memory plate 13 where the (+) first-order diffraction beam 21 is applied is varied by the ambient temperature and by the unit operating time, which would result in reading or writing incorrect data.

This deficiency is eliminated according to one aspect of the present invention, in which the (—) first-order diffraction light beam 22 from the light deflector 10 is monitored to compensate for any deviations in deflection angle. The (—) first-order diffraction beam 22 and the (+) first-order diffraction beam 21 form equal angles relative to the zero-order beam 20. The diffraction beam 22 and the (+) first-order diffraction beam 21 are affected equally by temperature changes in the light deflector 10, and the like. The diffraction beam 22 is focused on a hologram code plate 14 through a lens 12.

The memory plate 13 and the hologram code plate 14 are installed in a plane where the (+) and (—) first-order diffraction beams are deflected, and the distance from the deflector 10 to the deflection position on the memory plate 13 is made equal to the distance from the deflector 10 to the mini-hologram on the memory code plate 14. The focal length of the lens 11 is made equal to that of the lens 12. By this arrangement, the positional variation by the (+) first-order diffraction beam 21 on the memory plate 13 is equal to that for the (—) first-order diffraction beam 22 on the hologram code plate 14. When the number of points on the memory plate 13 where data is written or read is N (such a point will hereinafter be referred to as deflection point), then N+2 mini-holograms are set up one-dimensionally on the hologram code plate 14 at the same intervals as those of the deflection points. The apparatus is arranged such that when the (+) first-order diffraction beam 21 is directed to the i-th deflection point on the memory plate 13, the (—) first-order diffraction beam 22 is applied to the (i+1)th mini-hologram on the hologram code plate 14.

Gray codes corresponding to the position of each mini-hologram are recorded as hologram codes at the mini-holograms on the hologram code plate 14. Therefore, a mini-hologram on the hologram code plate 14 reproduces a light dot train 24 of Gray code binary digits identifying the address of the corresponding (+) first-order diffraction beam 21 when such mini-hologram is correctly exposed to the (—) first-order diffraction beam 22. The reproduced light dot train 24 projects upon a photodetector 15. A method for fabricating the hologram code plate 14 is described in U.S. Pat. No. 3,658,402 or Japanese Patent application No. 83023/69.

The light dot train 24 is converted into an electric signal 25 by the optical detector array 15. The signal 25 is converted into a binary code 26 by a code converter 16. The binary code 26 which indicates the position on the hologram code plate 14 where the light beam is applied is compared with the access signal 3 by a comparator circuit 17. The (+) first-order diffraction beam 21 and the (—) first-order diffraction beam 22 are deflected in accordance with the binary access signal 3, as described previously. Hence, when the device is operating normally, the binary signal 26 which indicates the actual deflection value is in exact coincidence with the access signal 3. In this case, a feedback signal 27 for controlling the oscillation frequency of the high frequency oscillator 18 does not vary the oscillator frequency.

If, however, the deflection position of the (+) first-order diffraction beam 21 deviates at the memory plate 13 for any reason, e.g., because of a temperature change in the light deflector 10, and an adjoining deflection point is exposed to the beam, then the (—) first-order diffraction beam 22 is similarly directed to the adjoining mini-hologram. Accordingly, an incorrect light dot train is reproduced from the mini-hologram. The signal 26 which results from the reproduced light dot train and supplied to the code comparator 17 therefor differs from the initial access signal 3. The difference between the two signals is measured by the comparator 17 using a high speed clock signal, and is then loaded into a register in the comparator 17. A command signal 27 dependent upon this difference signal is generated to increase or decrease the oscillation frequency of the high frequency oscillator 18 so that the diffraction beam 21 is directed to the deflection point on the memory 13 commanded by the access signal 13.

The difference code registered in the register in the comparator 17 is held if the monitor beam 22 is directed to the correct position, i.e., the (*i*+1)th mini-hologram on the hologram code plate 14 following the command signal 27. If the monitor beam 22 is over-modified to create an error in the opposite direction, the data stored in the register decreases, and this operation is repeated until the diffraction beam is deflected to the correct position. In this manner, the frequency of the deflector driving signal 28 from the high frequency oscillator 18 is controlled and the (+) first-order diffraction beam 21 accesses the correct deflection point on the memory plate 13 designated by the access signal 3. When the high frequency oscillator 18 is of synthesizer type, the code recorded in the register is added to the access signal 3. For a high frequency oscillator 18 of the voltage controlled type, the code recorded in the register may be added to the access signal, or converted into an analog signal by a digital-to-analog converter so that the control voltage of the voltage controlled oscillator is changed.

As described previously, the number of mini-holograms on the hologram code plate 14 is larger by two than the number of deflection points on the memory plate 13. These two mini-holograms are located at the positions on the hologram code plate 14 corresponding to positions adjacent to the right and left ends on the memory plate 13. This arrangement is useful to maintain feedback loop control in the manner described in detail above where the end positions of memory 13 are addressed, and where spurious conditions deviate the access beam 21 one position outside of the desired deflection point.

A positional code of each mini-hologram on the hologram code plate is recorded in a Gray code, for purposes now considered. Assume that the inadvertent deviation in the deflection position of the (+) first-order diffraction beam 21 is small and the diffracted beam is directed to an area between two adjacent deflection positions. Then the (−) first-order diffraction beam 22 is applied between two adjacent mini-holograms. As a result, the positional codes of the two mini-holograms are concurrently reproduced, and the superimposed sum of two light dot trains is detected by the photodetector 25. Were the signal detected of a non-Gray binary code, it is probable that the logically summed signal would represent a positional code which substantially deviates from either one of the positional codes of the two adjacent mini-holograms. In such an event, the comparator circuit 17 would generate a large error signal 27 which would be entirely different from the real error signal, and cause the oscillation frequency of the high frequency oscillator 18 to be substantially varied. This can cause the light deflection control system to become unstable. However, because the Gray code actually employed is a number notation in which two adjacent codes differ by only one bit, even if codes of two mini-holograms are concurrently reproduced and the sum of two light dot trains is detected by the photodetector, the detected signal represents the access code of one of the two mini-holograms. Consequently, the comparator circuit generates a correct error signal which makes it possible to stably control light deflection.

A second embodiment of the present invention will be described with reference to FIG. 2, wherein a light beam is directed on a random access basis to a two-dimensional optical memory. An incident light beam 20 is deflected by a vertical light deflector 101 and a horizontal light deflector 102. A principal deflection light beam 203 comprises the (+) first-order vertical beam diffracted by the light deflector 101 which is then deflected by the lateral light deflector 102 and comprises the (+) first-order diffraction beam of that deflector. By changing the frequencies at which the two light deflectors 101 and 102 are driven, the beam 203 can be directed to any desired deflection point on the memory plate 123. In this embodiment, the light beam 203 will be called the (+1, +1) beam.

As described previously, a light beam transmitted through a light deflector undergoes diffraction by interference with an ultrasonic wave, and is divided into at least three diffraction beam components, viz., (+) first-order, zero-order and (−) first-order components. Therefore the incident light beam 20 is transmitted through the light deflectors 101 and 102 to become various light components besides the (+1, +1) beam. That is, there is a light component comprising the (+) first-order vertical diffraction beam (by deflector 101) which is not deflected by the lateral light deflector 102, i.e., the (0, +1) beam. Also, there is a (+1, 0) beam component comprising the (+) first-order laterally deflected beam which is not diffracted by the vertical light deflector 101. Similarly, there are (−1, 0) (0, −1) and (0, 0) output beam components.

In FIG. 2 there are shown the (0, 0) beam 200, the (0, +1) beam 201, and the (+1, 0) beam 202. The beams 201 and 202 have the same variation components which the principal memory accessing deflection beam 203 receives via the vertical deflector 101 and the lateral deflector 102 in the respective directions. Therefore, when the beams 201 and 202 are used as monitor beams, and a control system as in the first embodiment is utilized for both the lateral and vertical directions, the light beam 203 can be accurately directed to the desired deflection point on the memory plate 123 in the two-dimensional deflector arrangement.

The principal deflection beam 203 is focused by a lens 113 and directed to the desired deflection point on the memory plate 123. The (0, +1) beam 201 is focused by a lens 111 onto a vertical one-dimensional hologram code plate 121. Similarly, the (+1, 0) beam 202 is focused by a lens 112 onto a lateral one-dimensional hologram code plate 122. When the number of deflection points in the vertical direction on the memory plate 123 is N, and the number of deflection points in the lateral direction is M, the vertical hologram code plate 121 comprises a one-dimensional hologram array formed of N+2 mini-holograms, and the lateral hologram code plate 122 is of one-dimensional hologram array including M+2 mini-holograms. This arrangement is the same as in the foregoing one-dimensional deflection stabilizer.

The hologram code plates 121 and 122 are arranged so that when the principal deflection beam 203 is directed to the vertical $i$–th and lateral $j$–th deflection point on the memory plate 123, the (0, +1) beam 201 is focused on the ($i$+1)th mini-hologram on the vertical one-dimensional hologram code plate 121, and the (+1, 0) beam 202 is focused on the ($j$+1) mini-hologram on the lateral one-dimensional hologram code plate 122. The system is arranged such that the magnitude of deflection is larger as the number assigned to each deflection point increases. On the hologram code plates 121 and 122, positional codes representing the corresponding memory plate locations are recorded in Gray codes.

Assume a mode of operation where the light beam 203 access is the $i$-th (row) and $j$-th (column) deflection point on the memory plate 123. A vertical access binary code signal 21 and a lateral (horizontal) access binary code signal 22 are respectively applied to a high frequency oscillator 161 which drives the vertical light deflector 101, and to a high frequency oscillator 162 which drives the horizontal light deflector 102, both light deflectors thus being driven at their individual frequencies. By this operation, the principal deflection beam 203 is directed to the *i*-th (row) and *j*-th (column) deflection point on the memory plate 123.

Coincidentally therewith, the (0, +1) beam 201 is focused on the (*i*+1) mini-hologram on the vertical one-dimensional hologram code plate 121. On this mini-hologram, the vertical positional code corresponding to the access binary code is recorded as a Gray code. Hence, when the (0, +1) beam 201 is applied, a light dot train 221 representing the access position is reproduced. The (+1, 0) beam 202 is focused on the (*j*+1)th mini-hologram on the horizontal one-dimensional hologram code plate 122 whereby a Gray coded light dot train 222 representing the lateral access position is reproduced.

The light dot train 221 reproduced on the vertical one-dimensional hologram code plate 121 is detected at a light detector 131 which converts the signal to electric form for delivery to the code converter 141. The code converter 141 converts the Gray code signal 231 into a binary code signal 241. The binary code signal 241 is supplied to a code comparator circuit 151 for comparison with the initial access binary code 21. If a thermal disturbance obtains in the light deflector 101, and the deflection point of the light beam 203 is deviated in the vertical direction into the (*i*+1)th row and *j*-th column on the memory plate 123, the (0, +1) beam 201 is deviated by the same amount as the beam 203. As a result, the (0, +1) beam 201 is directed to the (*i*+2)th mini-hologram on the vertical one-dimensional hologram code plate 121. In this case, the light dot train reproduced from the (*i*+2)th mini-hologram is one bit different from that obtained from the (*i*+1)th mini-hologram which is exposed to the beam in proper operation.

This light dot train 221 is converted into an electric signal 231 at the light detector 131. The signal is converted into a binary code signal 241 by the code converter 141. This signal 241 is compared with the initial access binary code 21 at the code comparator 151. The difference between the two signals is "1". Therefore the vertical deflector 101 must be controlled in the direction where the number assigned to the deflection point on the memory plate 123 to which the light beam is directed is reduced by one. To reduce the magnitude of deflection, the oscillation frequency of the oscillator 161 is to be decreased. Therefore, a control signal 251 is generated from the comparator 151 so that the oscillation frequency of the oscillator 161 is decreased, and the (0, +1) beam 201 is correctly directed to the (*i*+1)th mini-hologram. This also assures that the principal deflection beam 203 is applied to the correct deflection point on the two-dimensional optical memory plate 123.

With respect to lateral deviation, the principal deflection beam 203 is controlled by the control loop comprising a lateral one-dimensional hologram code plate 122, a light detector array 132, a code convertor 142, a code comparator circuit 152, a lateral light deflector driving high frequency oscillator 162, and a lateral light deflector 102.

In the foregoing embodiment of FIG. 2, the (0, +1) and (+1, 0) beams are used as monitor beams. Alternatively, only the (−1, −1) beam may be used as a monitor beam, as shown in FIG. 3. This arrangement may be used when the (−1, −1) beam 204 is sufficiently strong for purpose of monitoring. The beam 204 is in a relationship of axial symmetry with the principal light beam 203 with respect to the undiffracted (0,0) beam 200. When the number of deflection points on the memory plate 123 is M×N, the hologram code plate 124 is made up of (M+2)× (N+2) two-dimensional holograms. The mini-hologram on the hologram code plate 124 corresponding to the *i*-th row and *j*-th column deflection point on the memory plate 123 is located at the (*i*+1)th row and (*j*+1)th column. A Gray code corresponding to the binary access signal designating the *i*-th row and *j*-th column deflection position on the memory plate 123 is recorded in the (*i*+1)th row and (*j*+1)th column position (small hologram) on the hologram code plate 124. When the monitor beam 204 is applied, the light dot trains representing the recorded positional codes are reproduced in the photodetector arrays 131 and 132. The arrangement and operation of these devices are the same as in the embodiment shown in FIG. 2.

In the foregoing embodiments, the number of mini-holograms on the hologram code plate is larger by two than the number of deflection points on the memory plate. Alternatively, the number of mini-holograms may be more than this. The focal length of the lens for focusing the principal deflection beam need not necessarily be the same as that of the lens for focusing the monitor beam. For example, to enable the control system to be built into a small size, the size of the hologram is reduced, and the focal length of the lens for focusing the monitor beam is made smaller than that of the lens for focusing the principal deflection beam. What is essential is that the monitor beam is directed tc a mini-hologram corresponding to the deflection point on the memory plate where the principal deflection beam is applied.

The above described arrangements have thus been shown to accurately position a memory accessing light beam, obviating any ambient effects which tend to spuriously divert the beam deflection.

The above described arrangements are merely illustrative of the principles of the present invention. Numerous modifications and variations thereof will be readily apparent without departing from the spirit and scope of the present invention.

What is claimed is:

1. An arrangement for stabilizing light deflection comprising: an ultrasonic light deflector for controlling the magnitude of deflection of an incident coherent light beam dependent upon the frequency of a deflector-driving high frequency electronic signal; a high frequency oscillator connected to said deflector for supplying thereto a high frequency signal having a frequency dependent upon an access signal designating the magnitude of the coherent light deflection; a hologram code plate comprising a plurality of mini-holograms for reproducing a light beam train representing a code of the positional coordinate where the deflected coherent light beam is applied; a photodetector for detecting the reproduced light beam train; and a comparator coupled to said photodetector for comparing the output signal of said photodetector with the access signal and for controlling the oscillation frequency of the high frequency oscillator to achieve coincidence between the two signals.

2. A combination as in claim 1 further comprising an optical information storage plate irradiated by a second first order defraction beam component of said incident beam.

3. A combination as in claim 1 wherein said beam deflection means comprises cascaded vertical and horizontal beam deflecting ultrasonic deflection and said controlled means comprises first and second high frequency oscillators for respectively supplying oscillations of variable frequency to said horizontal and vertical deflectors.

4. A combination as in claim 1 wherein said holographic plate stores information in Gray code form.

5. A combination as in claim 4 further comprising a code converter disposed intermediate said photodetector means and said comparator means.

* * * * *